June 19, 1956  A. R. HILSINGER  2,750,821
TOOL FOR REMOVING DAMAGED SCREWS
Filed Dec. 21, 1954
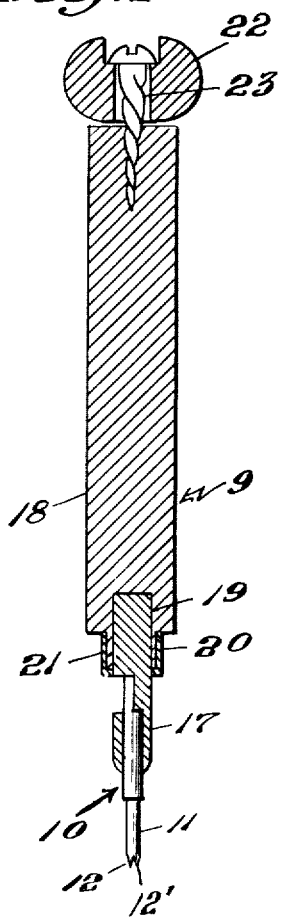
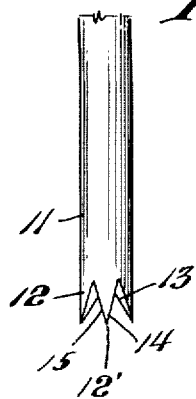
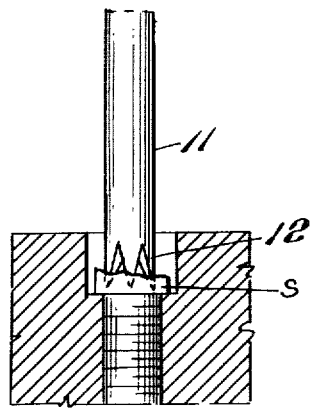
INVENTOR.
Arthur R. Hilsinger
BY
Barlow & Barlow
ATTORNEYS.

United States Patent Office 2,750,821
Patented June 19, 1956

2,750,821
TOOL FOR REMOVING DAMAGED SCREWS

Arthur R. Hilsinger, Mount Tabor, N. J., assignor to Sadler Bros., Inc., a corporation of Massachusetts Application December 21, 1954, Serial No. 476,823

1 Claim. (Cl. 81—3.5)

This invention relates to a tool for removing a damaged screw, such for example as a broken head or sheared-off shank, particularly a small size screw.

Heretofore, the removal of a damaged screw, particularly the tiny screws employed in optical work, was a time consuming operation. In the removal of these tiny screws it is usual to drill the screw. The drilling operation is somewhat difficult in that skill is required to properly center the drill and maintain the same centered on an uneven surface, and it is usual to cause damage to the screw threads engaged by the screw.

An object of the invention is to provide a tool so constructed as to be particularly adapted for the removal of tiny screws with damaged heads or twisted-off shanks.

A more specific object is to provide a tool having a plurality of very sharp prongs adapted to be forced by normal pressure into the broken screw to readily provide ample purchase for turning the screw.

With these and other objects in view, the invention consists of certain novel features of construction as will be more fully described and particularly pointed out in the appended claim.

In the accompanying drawings:

Figure 1 is a central longitudinal sectional view of a tool embodying my invention for removing damaged screws;

Figure 2 is a view of a fragmentary portion of the work-engaging end of the tool shown in Figure 1 but on a much enlarged scale;

Figure 3 is a cross sectional view of one of the work-engaging points of the tool; and Figure 4 is an elevational view showing the manner in which the tool is employed.

Referring to the drawings for a more detailed description of the invention, 9 designates generally the body of the tool from which there projects a hardened steel cylindrical shank 10 having a reduced portion 11, the free end of which is formed with a plurality of teeth 12 with sharpened points 12', there being four teeth which are spaced circumferentially 90 degrees apart, although this number may be varied. The teeth 12 are triangular in shape lengthwise and also triangular in shape in cross section, as shown in Figure 3. Thus, each tooth 12 is formed with three cutting edges 13, 14, and 15. The edge 13 tapers inwardly to increase the base of the tooth, and opposite edges 14 and 15 diverge from the point 12'. The shank 10 is received in a metal sleeve 17 and is frictionally secured thereto as by a press fit.

The body 9 forms a handle 18 which may be made of any suitable material, as for example wood, usually employed for making tool handles. The handle is cylindrical and has a bore 19 in which the sleeve 17 is received and frictionally secured to abut against the bottom wall thereof. The handle has a reduced portion 20 which receives a reinforcing metal ferrule 21. The other end of the handle has a button 22 rotatably secured in position by means of a screw 23.

In the use of the tool (see Figure 4) the points 12' are forced into the screw S a distance sufficient to provide a purchase thereon for turning the same. As previously stated, the shank 10 is made of a hardened steel much harder than the material of the usual screw, and the cutting edges of the points 12 will cut into the screw by manual pressure applied on the handle to embed therein a distance sufficient to grip the same and permit turning of the screw to back the same out of its hole.

It will be apparent that I have disclosed a tool of a simple construction which may be easily employed for removal of damaged screws, particularly in the smaller sizes employed in optical work.

I claim:

A tool for removing damaged relatively small screws comprising a body having a hardened steel shank extending from one end thereof provided with a plurality of sharpened teeth adapted to be manually forced and embedded in a screw to provide a purchase thereon to turn the same, each of said teeth being similar and triangular in longitudinal cross section providing three sides converging outwardly to a point providing three triangular shaped sides with one of said sides extending in continuation of the outer surface of said shank and the other two sides of said teeth extending from the edges of the said outer side inwardly and converging into a sharp edge providing three sharpened cutting edges extending from said point, and a handle at the other end of said body adapted to be engaged by the palm of the hand for applying a pressure on said tool for embedding the same into the material of the screw to be operated on.

References Cited in the file of this patent

UNITED STATES PATENTS

| 782,201   | McGahan et al. | Feb. 7, 1905  |
| 1,179,680 | Tallyn         | Apr. 18, 1916 |
| 1,232,806 | Johnson        | July 10, 1925 |
| 1,547,944 | Murphree       | July 28, 1925 |
| 1,549,041 | Berg           | Aug. 11, 1925 |
| 1,785,847 | Valentine      | Dec. 23, 1930 |
| 2,684,526 | Hoover         | July 27, 1954 |

FOREIGN PATENTS

| 201,705 | Switzerland | Mar. 1, 1939 |
| 241,061 | Switzerland | June 1, 1946 |